US007898384B2

(12) United States Patent
Rinaldi

(10) Patent No.: US 7,898,384 B2
(45) Date of Patent: Mar. 1, 2011

(54) SYSTEM FOR CHECKING THE SINGLE CROSSING OF A CONTROLLED PASSAGE

(75) Inventor: Rinaldo Rinaldi, Arezzo (IT)

(73) Assignee: Saima Sicurezza S.p.A., Arezzo (IT)

( * ) Notice: Subject to any disclaimer, the term of this patent is extended or adjusted under 35 U.S.C. 154(b) by 1041 days.

(21) Appl. No.: 11/657,634

(22) Filed: Jan. 25, 2007

(65) Prior Publication Data

US 2007/0273498 A1 Nov. 29, 2007

(30) Foreign Application Priority Data

Feb. 9, 2006 (IT) .............................. AR2006A0009

(51) Int. Cl.

| | |
|---|---|
| ***G08B 13/00*** | (2006.01) |
| ***G08B 19/00*** | (2006.01) |
| ***G08B 21/00*** | (2006.01) |
| ***G08B 23/00*** | (2006.01) |
| ***G08B 25/00*** | (2006.01) |
| ***G08B 13/26*** | (2006.01) |
| ***G06K 19/00*** | (2006.01) |
| ***H04L 9/14*** | (2006.01) |
| ***H04L 9/32*** | (2006.01) |
| ***B60R 25/00*** | (2006.01) |

(52) U.S. Cl. ............ 340/5.3; 340/541; 340/5.2; 340/5.7; 340/562

(58) Field of Classification Search .......... 340/540–541, 340/5.1–5.2, 5.3–5.33, 561–564, 555–557
See application file for complete search history.

(56) References Cited

U.S. PATENT DOCUMENTS

| | | | | |
|---|---|---|---|---|
| 6,025,726 A * | 2/2000 | Gershenfeld et al. | .......... | 324/671 |
| 6,275,146 B1 * | 8/2001 | Kithil et al. | ................ | 340/425.5 |
| 6,611,195 B1 * | 8/2003 | Manneschi et al. | .......... | 340/5.52 |
| 2002/0154012 A1 * | 10/2002 | Risi | .............................. | 340/541 |
| 2003/0029992 A1 * | 2/2003 | Kudo et al. | .................. | 250/221 |

* cited by examiner

*Primary Examiner* — Benjamin C Lee
*Assistant Examiner* — Michael Shannon
(74) *Attorney, Agent, or Firm* — Young & Thompson

(57) ABSTRACT

The system includes an intercepting booth (1) and at least two detecting units (2) and (3), of which the first one analyzes the variation over time of the weight of people or things penetrated into the booth, the second one analyzes the variation over time of the capacity of the electrical capacitor consisting of two metal armors (4) and (5) between which the controlled passage into the booth (1) is comprised. It further includes an electronic programmed processing unit (8) the inputs (9) of which are connected to at least the two detecting units (2) and (3) and the outputs (10) of which are connected to at least one alarm unit (11) and the elements for locking at least the door (13), of the booth (1) that separates the controlled passage (6) from the protected area (14).

10 Claims, 2 Drawing Sheets

SYSTEM FOR CHECKING THE SINGLE CROSSING OF A CONTROLLED PASSAGE

BACKGROUND OF THE INVENTION

The invention relates to a system for checking the single crossing of a controlled passage in order to prevent several people from penetrating at the same time into a protected area accessed through said passage.

According to the prior art, the access control aimed at preventing the concurrent entrance of several people in a protected area is obtained in one case with an intercepting booth with interlocked doors, hereinafter indicated as "booth" for shortness, combined with a static weighing device. The people penetrated into said booth are weighed and if their weight is less than the weight programmed for triggering the alarm status, the electronic programmed unit said booth is fitted with pilots the opening of the exit door of the booth, thus allowing the weighed people to penetrate into the protected zone. On the other hand, if their weight is more than that programmed, the alarm triggers, the access door to the protected area remains locked in the closed state and an operator inside the protected area is warned, who checks through direct view or through a video system whether inside the booth there is very heavy person or the alarm has been caused by the concurrent presence of several people into said booth.

In the first case, the operator disables the alarm, enables the opening of the access door to the protected area thus allowing the passage and therefore the crossing of the booth itself, then resets the control system, setting it to carry out the check on the following crossing people.

In the second case, on the other hand, the operator disables the lock of the booth access door, asks the people inside the booth to step back and then enter again into the booth one at a time, after the control system has been reset.

Such system, therefore, upon the passage of a person weighing more than the maximum programmed one goes into alarm and temporarily stops the system itself until the operator intervenes; on the other hand, the concurrent passage of several people through the booth is not detected if they are thin and their overall weight is less than the maximum programmed weight.

Such system therefore is imperfect and definitely unsafe. Another system envisages resort to a booth combined with a dynamic weight detector. Such solution analyses the variation over time of the weight resting on the weighing system associated to the booth, from the opening of the access door to the time when said door closes again. Any limits of weight of the people admitted to the passage are excluded. In this case, heavy people can pass without triggering any alarms provided that the system that analyses the variation over time of the weight of the people penetrated into the booth interprets what has penetrated into the booth itself as a single body. Two people that penetrate together and in synchronism or one clinging to the other's shoulders are interpreted as a single person, and the control system allows their passage. It therefore is an unreliable control system. Another technical solution currently used uses an ultrasound system for analysing the volume inside the booth that delimits the controlled passage. In such solution, the system enables the alarm systems if a volume occupied inside the booth is detected that is higher than a programmed value that is assumed to be due to the presence of several people and/or things therein. This technology is the cause of several false alarms both if the person passing carries relatively bulky personal items and if the person passing has a considerable body mass.

On the other hand, such system does not detect the presence into the booth of several people with a fine body, in particular when they are close to each other so as to look like a single body. Such solution therefore is imperfect and unsafe.

A further technical solution uses biometric data readers, normally located inside the booth. During the check, carried out with both booth doors in the closed state, the person inside said booth allows the reading of a personal biometric data by the detection system. The latter checks the matching of the biometric data read with one of those entered beforehand into a database and belonging to the people admitted to the passage, allows the person subject to check to cross said booth and thus the access to the protected area, also when he/she is with other people, ill intentioned or not, that can therefore penetrate into the protected area without being checked.

It therefore is an unsafe system, such as when the person enabled to access the protected area is hostage of ill intentioned persons that follow him/her armed.

In yet another case the booth is fitted with magnetic card reader. The card contains the data of the person it has been assigned to, among which in some cases his/her weight too, in that case requiring that the access control booth is fitted, besides a card reader, also with a weighing unit. Such solution should check that the crossing of the controlled passage occurs only by the card holder person. In the practice, however, it does not check whether the person passing actually is the one the card has been assigned to or it is another person with almost the same build.

The known control systems therefore are not satisfactory since they give rise to several false alarms, in some cases they allow unchecked persons to access the protected area at the same time as others, in other cases they allow access to persons other than those authorised. For this reason several managers of protected areas that must be accessed by people with single crossing, give up known control systems and make resort to the use of specific personnel in charge of the check, even if this requires very high management costs.

SUMMARY OF THE INVENTION

It is an object of the present invention to find a system which should allow ensuring that a controlled passage, for separating a free area from a protected area, is crossed by single persons, one after the other.

It is another object of the present invention to find a system which should be capable of preventing the passage of two or more people when they enter at the same time into the controlled passage.

It is a further object of the present invention to find a system fitted with control means and intercepting booth, for delimiting the controlled passage, which may also be relatively large for making its crossing easy even by people with bulky build and for recognising them as single persons and thus allow them to cross the same controlled passage without false alarms.

The invention that has allowed reaching such results is embodied in a system which analyses the different and independent physical-dynamic parameters with the purpose of making false alarms null or at least minimal, and speeding up the crossing of the controlled passage separating the external free area from the internal protected area by single persons. Such invention comprises a booth, delimiting the controlled passage, and at least two detecting units, of which the first one analyses the variation over time of the weight of people or things penetrated into the booth, the second one analyses the variation over time of the capacity of the electrical capacitor consisting of two metal armours between which the controlled passage into said booth is located. It further comprises an electronic programmed processing unit the inputs of which are connected to at least the two detecting units and the outputs of which are connected to at least one alarm unit and the means for locking at least the door, of the booth that separates the controlled passage from the protected area.

Such invention is advantageous since the booth, however shaped, provides information about the weight of the people and/or things penetrated therein and the variations of the same over time, since said weight begins to rest on said booth until the access door of the same is closed, with said information that can be easily interpreted by the electronic programmed unit they are transmitted to.

Another advantage of the invention is given by the use of a capacitor detecting unit, suitable for providing information on the variation over time of the capacity of the electrical capacitor consisting of two conductive armours, normally located one into the floor and one into the ceiling of the booth. The information starts with the access of people and/or things into said booth until the access door is closed again, with said variations strictly related to the bodies entered into the booth and to their typology and nature, therefore easily interpreted by the electronic programmed unit they are transmitted to.

Another advantage results from the fact that the booth may be easily combined with other detecting units or devices for allowing the electronic programmed control unit to be provided with further independent information, through the analysis of which and from what programmed therein, upon the crossing of the controlled passage, decide whether the crossing and thus access to the protected area should be allowed or not.

BRIEF DESCRIPTION OF THE DRAWINGS

These and other advantages will be easily understood, especially by the men skilled in the art, reading the following detailed description of the preferred embodiment exemplified in the drawings shown on the annexed tables, wherein.

Figure 1:
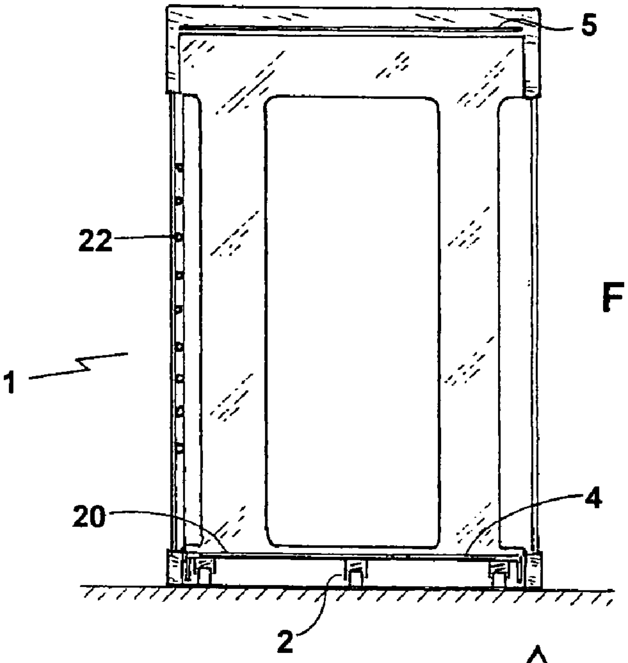
FIG. 1 is an elevation view of a booth combined with a dynamic weight detector, a capacitor dynamic detector and an entrance optical detector.

It is understood that the drawings are for by way of an example and are provided for facilitating the understanding of the invention, without being any limitation thereto.

DESCRIPTION OF THE PREFERRED EMBODIMENT

The invention therefore relates to a system for checking and therefore controlling the single crossing of a passage 6 which prevents the passage every time several persons 7 try to cross it at the same time, with said passage 6 delimited by a booth 1 through the crossing of which a protected area 14 is accessed.

Such system comprises said booth 1, provided with a detecting unit 2 which signals the variation over time t of weight P of people 7 penetrated into booth 1 and weighing on the weighing system said detecting unit 2 is fitted with.

It further comprises a detecting unit 3 which signals the variation over time t of capacity C of an electrical capacitor, between whose armours 4 and 5 there is the controlled passage 6, so that the passage of a body, and in particular of a person 7 or a sequence of persons 7, altering the nature of the space comprised between said armours 4 and 5, determines a variation of capacity C of said electrical capacitor.

The system further comprises an electronic programmed unit 8, to whose inputs 9 at least the electrical signals produced by the detecting unit 2 are sent, which signals the variation over time t of weight P of the people or things penetrated into booth 1 and by the detecting unit 3 that signals the variation over time t of capacity C of said electrical capacitor. Its outputs 10 are connected to at least one alarm unit 11 for signaling the alarm status and to at least the device that controls the opening and locking of door 13 separating the controlled passage 6, the one delimited by booth 1, from the protected area 14 where the single persons 7 should go.

Figure 2:
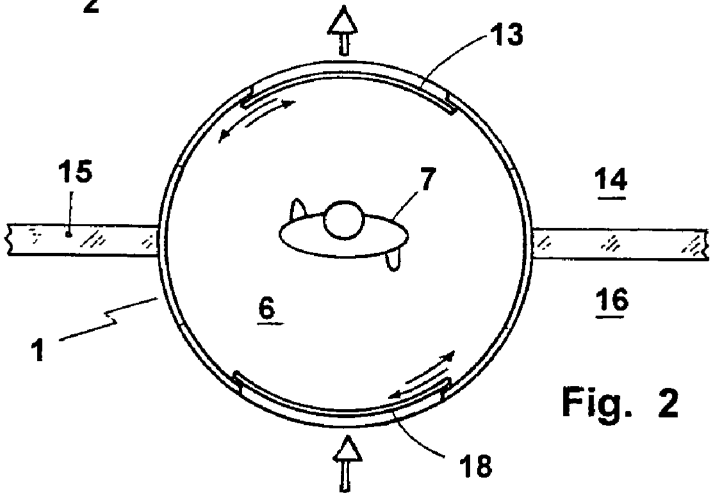
FIG. 2 is a schematic top plan view of a circular section booth with a person inside, located for delimiting the controlled passage.
Figure 3:
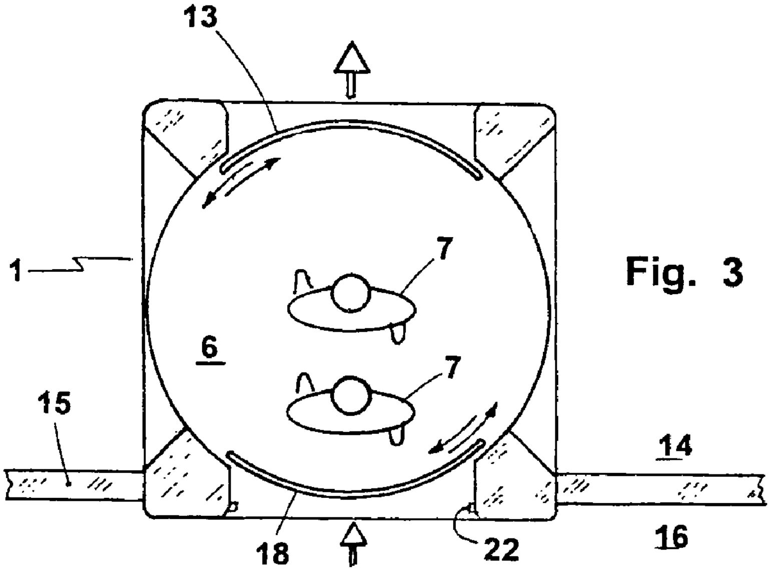
FIG. 3 is a schematic top plan view of a square section booth with two persons therein, located for delimiting the passage area or controlled passage.
Figure 4:
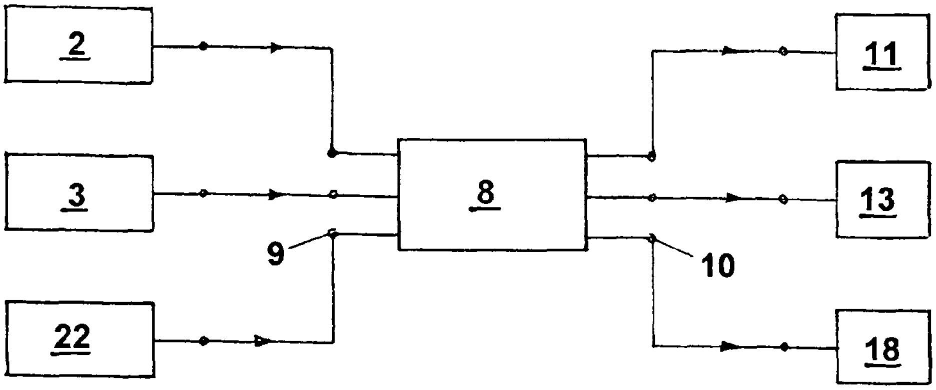
FIG. 4 shows the block diagram depicting the electronic programmed unit, at the entrances of which there are applied the three detecting units and whose exits are connected to an alarm unit and to means for locking the entrance door and the exit door of the booth.

In the preferred embodiment, booth 1 delimiting the controlled passage 6 is of the type with interlocked doors, whereas its structure can take different shapes, such as parallelepiped, square or rectangular base, shown in FIG. 3, and cylindrical, with almost circular base shown in FIG. 2.

Said booth 1 is normally inserted in a separating structure 15 suitable for dividing the free area 16, wherein single persons and/or groups can access, from the protected area 14, wherein single persons 7 are required to access, optionally after specific equipment, such as metal detectors, biometric data detecting units and others, has carried out specific scans and analyses on those passing through the controlled passage 6, with said analyses or checks carried out based on the services or works performed or whatever else is located into the protected area 14.

Booth 1, delimiting the protected area 14, normally has base 20 forming the weighing surface of unit 2 detecting the dynamic weight of what is passing, since it starts entering the booth until its entrance door 18 closes for allowing the analysis of what entered therein and, if it falls within the programmed and expected variation range, controlling the opening of door 13 that allows person(s) 7 to complete the crossing of the controlled passage 6.

Figure 5:
FIG. 5 shows a Cartesian diagram of the signal indicating the variation over time t of weight P of the people or things penetrated into the booth.

The weight detecting unit 2 is provided with a mechanical-electric transducer by which the variation over time of the balance state of the weighing system is transformed into an electrical signal, of the type shown in FIG. 5, with amplitude of the signal produced variable over time in a manner, instant by instant, proportional to the weight resting on the base of booth 1 itself or in any case on the weighing system associated thereto.

The measurement of the variation over time t of weight P of what penetrated into booth 1 ends with the closing of door 18 through which access therein has occurred.

The electronic programmed unit 8 therefore receives an electrical signal at one of its inputs 9 that indicates the variation over time t of weight P penetrated into the controlled passage 6 and therefore the weights relating to the different steps of the corresponding electrical signal based on the value of which and based on what envisaged in the program that controls the electronic programmed unit 8, the latter pilots what connected to its outputs 10.

The second detecting unit, indicated with reference numeral 3, measures the variation over time t of a capacity C and comprises an electrical capacitor, normally consisting of two armours 4 and 5 made with two metal plates delimiting the passage 6 to be controlled. Capacity C of said electrical capacitor depends, other parameters being equal, on what is arranged between its armours 4 and 5. Said capacity therefore changes in value when booth 1 from the empty stated changes into the state occupied by one or more persons 7.

Figure 6:
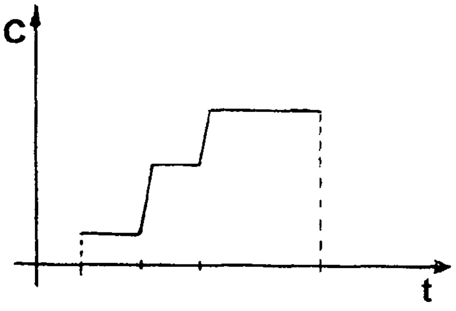
FIG. 6 shows a Cartesian diagram of the signal indicating the variation over time t of capacity C of the electrical capacitor—when people or things penetrate into the booth—if its armours are located one into the floor and the other into the ceiling of the booth itself.

It has been experimentally noted that the entrance of two persons 7 into the booth in a succession, as shown in FIG. 3, before the entrance door 18 of the booth itself closes, causes a variation over time t of capacity C of said capacitor as shown in FIG. 6.

The detecting unit 3 associated to booth 1 in the controlled passage 6 therefore originates an electrical signal of amplitude variable over time proportional to the capacity of the electrical capacitor between whose armours 4 and 5 the passing bodies are located, from the moment they penetrate into the booth to the moment its entrance door 18 closes.

The electrical signal originated by said detecting unit 3 is also transmitted, normally in digital format, to the electronic programmed unit 8 that, based on the shape and amplitude of said signal, carries out its analyses to be compared with those generated by the detecting unit 2, then makes the consequent decisions.

The described checking system may be fitted with other detecting devices for increasing the independent information to be sent to the electronic programmed unit 8, so as to reduce the error margin the two detecting units 2 and 3 alone could cause.

One of such additional detecting devices may consist of an optical detector 22, normally of the type with light rays in the infrared field, to be positioned on a plane at the access of booth 1, also called interdiction plane.

Such detecting device 22 originates a signal instant by instant, proportional to the number of light rays intercepted and therefore interrupted on the interdiction plane, from the moment the people and/or things start penetrating into booth 1 to the moment when the access door 18 of the latter closes.

Figure 7:
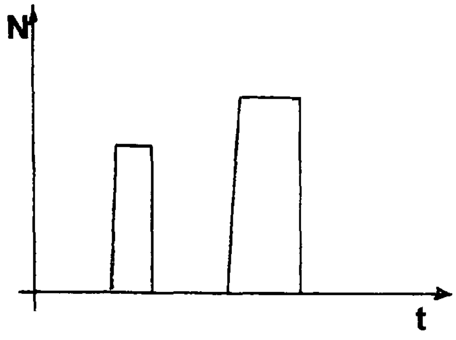
FIG. 7 shows a Cartesian diagram of the signal indicating the variation over time t of the number of optical rays N of the optical detector intercepted by the people and/or things penetrated into the booth starting from the opening up to the closing of its access door.

Electrical signal that upon the passing of two people 7 one after the other and not close to one another, as shown in FIG. 3, will be of the type shown in FIG. 7.

Other auxiliary devices may be fitted to booth 1 and the checking system described.

The electronic programmed unit 8, processes the signals as they arrive from the detecting units and if their analysis, based on what programmed therein, indicates the entrance and the presence of more than one person 7 into the booth delimiting the controlled passage 6, starts the alarm unit 11, light, sound or of any type known in the art, and at least the device that prevents the opening of door 13 separating the controlled passage 6 from the protected area 14.

The invention claimed is:

1. A system for checking a single crossing of a controlled passage, comprising:

an intercepting booth (1);

a first unit (2) for detecting a variation over time (t) of the weight (P) of one or more people (7) and/or things in a controlled passage (6) delimited by the intercepting booth (1);

a second unit (3) for detecting a variation over time (t) of a capacitance (C) of an electrical capacitor, the electrical capacitor comprising two metal armours, the controlled passage (6) being located between the two metal armours; and an electronic programmed unit (8) with i) inputs (9) connected to at least the first unit (2) and the second unit (3), and ii) outputs (10) connected at least to an alarm unit (11) and to a device for controlling at least an opening and closing of a door (13) separating the controlled passage (6) from a protected area (14), wherein the electronic programmed unit is configured to compare a shape and amplitude of a first signal received from the first unit with a shape and amplitude of a second signal received from the second unit and, based upon the comparison, determine whether more than one person and/or thing has entered the intercepting booth (1) and, upon a positive determination that more than one person and/or thing has entered the intercepting booth (1), activate the alarm unit (11) and prevent an opening of the door (13).

2. The system, as claimed in claim 1, wherein the intercepting booth (1) comprises interlocked doors.

3. The system, as claimed in claim 1, wherein the intercepting booth (1) has a structure shaped as a parallelepiped.

4. The system, as claimed in claim 1, wherein the intercepting booth (1) has a structure shaped as a cylinder.

5. The system, as claimed in claim 1, wherein the intercepting booth (1) has at least one mobile base (20) forming a weighing surface operatively connected to the first detecting unit (2) and configured to dynamically detect the weight of the one or more people (7) and/or things inside the intercepting booth (1).

6. The system, as claimed in claim 1, wherein the first detecting unit includes a mechanical-electrical transducer configured to transform a mechanical variation, over time, resulting from a variation of the weight of the one or more people (7) and/or things in the intercepting booth (1) into an electrical signal with an amplitude variable over time proportional to said variation of the weight, the first signal received by the electronic programmed unit comprising the electrical signal.

7. The system, as claimed in claim 1, wherein a measurement of the variation over time (t) of the weight (P) of the people (7) and/or things in the intercepting booth (1) ends with a closing of an access door (18) through which the intercepting booth (1) is accessed from a free area (16) separate and distinct from the protected area (14).

8. The system, as claimed in claim 1, wherein a first (4) of the two metal armours is located in a floor of the intercepting booth (1) and a second (5) of the two metal armours is located towards a ceiling of the intercepting booth (1).

9. The system, as claimed in claim 1, wherein the second detecting unit (3) produces an electrical signal of amplitude variable over time proportional to the variation of the capacitance (C) of the electrical capacitor, the electrical signal being produced from a moment the one or more people (7) and/or things penetrate into the intercepting booth (1) to a moment an access door (18) closes, the second signal received by the electronic programmed unit comprising the electrical signal.

10. The system, as claimed in claim 1, further comprising:

an optical detecting unit (22) configured to produce a third signal proportional to a number of light rays interrupted on an interdiction plane by the one of more people (7) and/or things in the intercepting booth (1), the third signal being produced from a moment the one or more people (7) and/or things penetrate into the intercepting booth (1) to a moment an access door (18) closes, wherein the access door (18) provides access to the intercepting booth (1) from a free area (16) separate and distinct from the protected area (14), wherein the inputs (9) of the electronic programmed unit (8) are also connected to the optical detecting unit (22) to receive the third signal, and wherein the electronic programmed unit (8) is further configured to compare the third signal with the first and second signals to further determine whether more than one person and/or thing has entered the intercepting booth (1).

* * * * *